United States Patent [19]

Tyler et al.

[11] 3,965,396

[45] June 22, 1976

[54] CONDITION RESPONSIVE CONTROL CIRCUIT

[75] Inventors: Hugh J. Tyler, Santa Ana; Dennis E. Newell, El Segundo, both of Calif.

[73] Assignee: Robertshaw Controls Company, Richmond, Va.

[22] Filed: Mar. 13, 1974

[21] Appl. No.: 450,711

[52] U.S. Cl. .............................. 317/42; 317/13 B; 219/499; 219/510
[51] Int. Cl.² ......................................... H02H 7/08
[58] Field of Search ............. 317/13 B, 13 C, 13 R, 317/41, 42, 40 R; 307/252 F, 252 P, 310; 318/471, 473; 219/510, 499, 494, 497

[56] References Cited
UNITED STATES PATENTS

| 3,321,641 | 5/1967 | Howell | 317/13 C |
|---|---|---|---|
| 3,328,639 | 6/1967 | Gryctko | 317/13 C |
| 3,329,869 | 7/1967 | Obenhaus | 317/13 C |
| 3,457,460 | 7/1969 | Buiting et al. | 317/41 |
| 3,500,074 | 3/1970 | Obenhaus | 307/310 |
| 3,564,205 | 2/1971 | Tyler | 219/499 |
| 3,648,074 | 3/1972 | Nurnberg | 307/252 F X |
| 3,660,718 | 5/1972 | Pinckaers | 317/13 B |
| 3,739,198 | 6/1973 | Clements | 307/252 F X |

OTHER PUBLICATIONS
W. R. Spofford Jr., "The D13T–A Programmable U. J. T.", 11/67, Application Note.

*Primary Examiner*—J D Miller
*Assistant Examiner*—Patrick R. Salce
*Attorney, Agent, or Firm*—Anthony A. O'Brien

[57] ABSTRACT

A contactor or switch to an electrically powered unit, such as a motor, is controlled by a condition responsive circuit which may include facilities for changing the response condition of the circuit and/or facilities responsive to several conditions, such as temperature and excessive current.

16 Claims, 4 Drawing Figures

CONDITION RESPONSIVE CONTROL CIRCUIT

BACKGROUND OF THE INVENTION

1. Field of the Invention

The invention relates to condition responsive control circuits, and in particular, to circuits for controlling the application of electrical power to a unit, such as a electrical motor.

2. Description of the Prior Art

The prior art, as exemplified in U.S. Pat. Nos. 2,945,133, 3,366,843, 3,404,313, 3,416,060, 3,526,809, 3,555,356, 3,648,074, and 3,712,991, contains many control circuits which are responsive to a condition such as temperature. Some of the prior art motor control circuits are designed for interrupting the flow of electrical current to a motor if a sensed temperature of the motor windings exceeds a selected level; several of these motor control circuits have provisions for changing the temperature sensing level of the control circuit when the motor is running or when an excessive current condition indicating a locked rotor is sensed. Generally the prior art control circuits are characterized as having one or more deficiencies such as being unduly complex, requiring expensive specially manufactured components, having excessive labor costs in assembling, or having excessive variation in response with changes in ambient temperature.

Other systems used for motor protection include manual reset circuit breakers which act to rapidly respond to open the motor circuit under high amperage draw conditions. The manual reset requirement means that such devices will not restart until manually reset although in some cases the condition that caused the circuit to break may no longer exist after a period of time. Some control systems have a supplementary time delay device which prevents a try for a motor restart to be made until after a time delay from shutdown. This allows pressure bleed-off in refrigeration compressor applications to prevent starting stallouts. These systems are relatively costly in that both a circuit breaker and a time delay device are required.

Another motor protection device which provides protection from low voltage and higher than normal amperage draw conditions is a low voltage dropout relay which may be used to control the motor contactor. Under low voltage conditions the low voltage dropout relay acts to open the circuit to the contactor and protect the motor. They also prevent low voltage startup when stallout is likely. In this system the cost of the low voltage relay is in addition to the cost of the contactor.

For motor protection against insulation damage at high temperatures, thermal fuses and thermally tripped relays are available. Fuses are objectionable due to system shutdown until they are replaced. The conventional thermally tripped relay shuts off the motor at some temperature, as for example 121°C and allows restart at some lower temperature such as 66°C. Under slow temperature rise conditions such a system may be satisfactory. If a locked rotor condition exists, the rate of temperature rise is so rapid that the temperature can materially overshoot the temperature limit and cause motor winding insulation damage. A condition which causes subsequent recycling with continued lock rotor can further damage the motor from repeated temperature excusions into the insulation damaging range.

SUMMARY OF THE INVENTION

The invention is summarized in a condition responsive control circuit including primary switch means having open and and closed conditions and capable of controlling a power circuit; secondary switch means having an input and first and second output leads which are electrically connected when the switching means is in a closed condition and which are electrically disconnected when the switching means is in an open condition; the first output lead connected to the primary switch means for placing the primary switch means in one of its open and closed conditions when the secondary switch means is in its closed condition and for placing the primary switch means in the other of its open and closed conditions when the secondary switch means is in its open condition; condition responsive means including first and second resistances connected in a series circuit, a first junction intermediate a first side of the first resistance and the second resistance, a second junction on the second side of the first resistance, and a voltage responsive semiconductor control means having an input connected to the first junction and an output connected to the input of the secondary switch means; the second output lead of the secondary switch means connected to the second junction; and means for connecting the first output lead to the first side of the first resistance to form a shunt circuit across the first resistance when the secondary switch means is closed, whereby the open and closed condition of the secondary switch means both operates the primary switch means and changes a resistance value between the first and second junctions.

An object of the invention is to construct a reliable condition responsive control circuit utilizing a new combination of elements which are substantially less expensive and easier to assemble than previous control circuits.

Another object of the invention is to utilize the opening and closing of a switch device between a pair of output leads in response to a condition to perform a plurality of functions.

It is also an object of the invention to provide an improved current sensing facility for modifying a control circuit eliminating the need for expensive circuit breakers, excessive current responsive relays, fuses and the like for providing protection against excessive current, such as that which can cause motor winding insulation damage.

A further object of the invention is to utilize a resistance bridge circuit and eliminate the necessity of expensive and unreliable multitap transformers of prior art bridge control circuits.

One advantage of the invention is that a contactor or relay for controlling power current and the control circuit for operating the contactor can be packaged as a unit eliminating conventional supplementary components such as time delay devices and low voltage relays.

Additional features of the invention include the provision of a control circuit energized by an alternating current and sensing means providing pulsed output to a filter circuit to control a semiconductor switching element with a constant current; the provision of a magnetic sensing loop disposed adjacent a current line to a motor to sense a locked rotor condition of the motor; and the provision of a plurality of parallel resistance arms connected in series with a single switching device to be connected across one leg of a voltage sensitive resistance circuit.

Other objects, advantages and features of the invention will become apparent from the following description taken in conjunction with the accompanying drawings.

DESCRIPTION OF THE PREFERRED EMBODIMENTS

Figure 1:
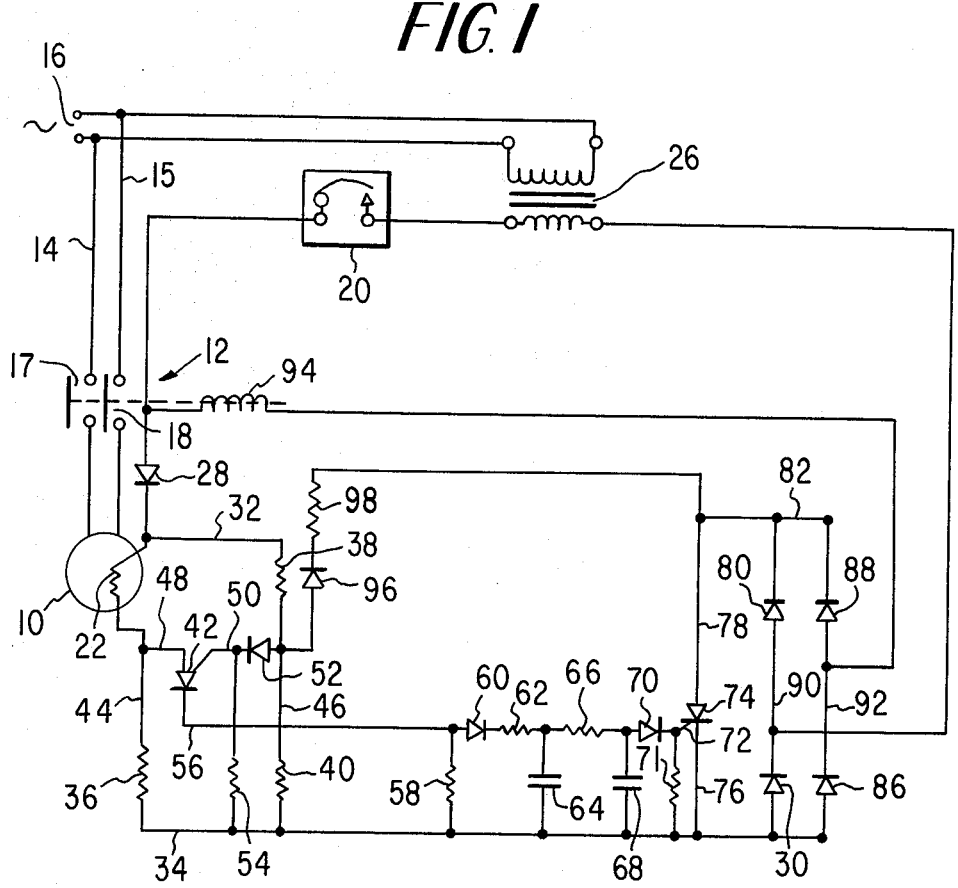
FIG. 1 is a diagram of a circuit in accordance with the invention.

As illustrated in FIG. 1, the invention is embodied in an electrical control circuit for a power unit, such as an electric alternating current (AC) motor 10, wherein the control circuit controls a primary switch device, such as a contactor or relay indicated generally at 12, for controlling electric power flow in power lines 14 and 15 connected from an AC power source 16 to the motor 10. The contactor 12 has normally open contacts 17 and 18 in series with the respective lines 14 and 15. The circuit is controlled by a control switch device, such as a thermostat 20, and a condition responsive element, such as a positive temperature co-efficient resistance element 22, the latter of which is mounted in the motor 10, such as in the motor windings. The switch device 20 operates the control circuit in response to a demand for operation of the motor 10 while the condition responsive element 22 controls the control circuit to prevent or terminate operation of the motor 10 upon sensing a predetermined condition.

The switch device 20 is connected in series with the secondary winding of a step-down voltage transformer 26, such as a 24-volt transformer, and with diodes 28 and 30 to respective power input nodes 32 and 34 of a resistance bridge circuit. The condition responsive resistance 22 is connected in one arm of the resistance bridge and is serially connected with a resistance 36 across the power nodes 32 and 34, the resistance 36 forming a second arm of the bridge. Resistances 38 and 40 in respective third and fourth arms of the resistance bridge are also connected across the power nodes 32 and 34. The junction of resistances 22 and 36 forms one sensing node 44 while the junction of resistances 38 and 40 form another sensing node 46 of the bridge circuit. A voltage sensing circuit including a voltage responsive semi-conductor device or a PNPN device with a trigger gate, such as a programmable unijunction transistor 42 (hereinafter referred to as PUT), is connected across the sensing nodes 44 and 46. An anode electrode 48 of the PUT 42 is connected to the node 44 and a gate electrode 50 of the PUT 42 is connected to the junction of a diode 52 and a resistance 54 serially connected between nodes 46 and 34. The PUT 42 is a PNPN semi-conductor device which is triggered into an avalanche conductive state between its anode electrode 48 and its cathode electrode 56 when the voltage on the gate electrode 50 is sufficiently negative with respect to the voltage applied to the anode electrode 48 to produce a forward triggering current through the PN junction between the anode electrode 48 and the gate electrode 50. The diode 52 has a polarity passing forward current from node 46 and has a forward temperature co-efficient of resistance matching the forward temperature co-efficient of resistance of the PN junction of the PUT 42 between the anode electrode 48 and the gate electrode 50. The resistance 54 has a value selected to limit current flow through the gate electrode 50 to a safe magnitude but to allow adequate current flow to trigger the PUT 42.

The cathode electrode 56 of the PUT 42 is connected through a resistance 58 to the node 34. A peak detecting and filtering circuit has a diode 60 connected between the cathode electrode and an integration and filter circuit including resistances 62 and 66 serially connected with the diode 60, a capacitance 64 connected between the junction of the resistances 62 and 66 to the node 34, and a capacitance 68 connected serially with the resistance 66 to the node 34. The output of the detecting and filtering circuit at the junction of the resistor 66 and the capacitance 68 is connected by a series diode 70 and resistance 71 in parallel to the capacitor 68 to the node 34. The junction of the diode 70 and resistance 71 is connected to a gate electrode of a secondary switch means or a PNPN semiconductor switch device such as a silicon controlled rectifier (hereinafter referred to as SCR) 74. The diode 70 has a polarity passing forward current from resistance 66 to the resistance 71 and the gate electrode 72. The value of the capacitors 64 and 68 and the resistances 66 and 71 are selected to filter pulses from the PUT 42 to maintain conduction through SCR 74 when the PUT 42 is nonconductive during negative half cycles applied to diodes 28 and 30. The SCR 74 is a PNPN semiconductor device which is triggered into an avalanche unidirectional conductive state between its anode lead or electrode 78 and its cathode lead or electrode 76 by a minimum positive current through the gate electrode 72 to the cathode electrode 76. The resistance 71 has a value selected to shunt the gate electrode 72 and cathode electrode 76 sufficiently to prevent a damaging voltage but to allow sufficient gate-cathode voltage to trigger the SCR 74.

The SCR 74 is connected across unidirectional output nodes, the cathode lead 76 connected to the negative node which is the common node 34 and the anode lead 78 connected to the positive node 82, of a bridge rectifier circuit including the diode 30 and a diode 80 in respective first and second arms across the output nodes 34 and 82 and diodes 86 and 88 serially connected in respective third and fourth arms of the rectifier bridge across the output nodes 34 and 82. Input nodes 90 and 92 of the rectifying bridge circuit are connected in series with an actuating coil 94 of the contactor 12 across the thermostat 20 and the secondary winding of the transformer 26. The polarities of the diodes 30, 80, 86 and 88 are selected to provide full wave current flow into the input nodes 90 and 92 whenever the SCR 74 is conductive and to provide substantially no current flow into the input nodes 90 and 92 when the SCR 74 is nonconductive.

A diode 96 and a resistor 98 are connected serially between the sensing node 46 and the anode lead 78 of the SCR 74. The diode 96 has a polarity and the resistance 98 has a value selected to produce a predetermined change in the resistance of the fourth arm between nodes 46 and 34 of the resistance bridge when the SCR 74 is conductive.

The actuating coil 94 of the contactor 12 is selected to close the contacts 17 and 18 when energized by a full wave AC current having a magnitude above a minimum actuating current and to open the contacts 17 and 18 when the current falls below a minimum holding current.

In operation of the control circuit of FIG. 1, the closing of the thermostat switch 20 applies half wave rectified pulses from the secondary of the transformer 26 through diodes 28 and 30 to the power nodes 32 and 34 of the resistance bridge. When the temperature of the winding of the motor 10 is below a first predetermined temperature, for example 68°C (155°F), the ratio of the resistance 22 to the resistance 36 (i.e. the quotient of the resistance 22 divided by the resistance 36) is sufficiently less than the ratio of the resistance 38 to the ratio of the combined resistances 40 and 54 to cause the gate electrode 50 of the PUT 42 to be sufficiently negative with respect to the anode electrode 48 to render the PUT 42 conductive. With the PUT 42 conductive, current from the cathode electrode 56 passes through the diode 60 to the resistor 62 charging the capacitor 64 and hence through the resistor 66 charging the capacitor 68. When the voltage across the capacitor 68 reaches a level greater than about two times the forward voltage drop of a semiconductor PN junction, current through the diode 70 and the gate electrode of the SCR 74 triggers the SCR 74 thus electrically connecting the lead 78 to the lead 76 and the node 34 so long as a minimum positive current passes through the SCR 74. Positive current flows through diode 88, SCR 74 and diode 30 when node 92 is positive and node 90 is negative, and current flows through diode 80, SCR 74 and diode 86 when the node 90 is positive and the node 92 is negative to actuate the winding 94 closing the contacts of the contactor 12 connecting the lines 14 and 16 to the input of the motor 10.

When the SCR 74 becomes conductive the resistance 98 and the diode 96 are connected in parallel with the resistances 40 and 54. This effectively lowers the resistance between the nodes 46 and 34 to lower the voltage on node 46 relative to node 44. Thus to render node 46 positive with respect to node 44, the resistance 22 must be increased by a sensed temperature of at least a second predetermined temperature, for example 121°C (250°F) which is greater than the first predetermined temperature.

In the event that the thermosensing resistance 22 is at a temperature greater than the first predetermined temperature when the thermostat 20 is closed and the SCR 74 is non-conductive, the ratio of the resistance 22 to the resistance 36 will be greater than the ratio of the resistance 38 to the parallel resistances 40 and 54 causing the gate electrode 50 to be positive to the anode electrode 48; thus the PUT is not rendered conductive during positive half cycles from the diode 28 and the SCR 74 remains non conductive to prevent energization of the winding 94 and the contactor 12.

In the event the temperature of the thermosensing resistance 22 rises to a temperature above the second predetermined temperature while the motor 10 is operating, the ratio of the resistance 22 to the ratio of the resistance 36 becomes greater than the ratio of the resistance 38 to the combination of the parallel resistances 40, 54 and 98 thus rendering the gate electrode 50 positive with respect to the anode electrode 48. Thus the PUT will not be triggered into conductivity during the next positive pulses applied to the nodes 32 and 34. After the charge on the capacitors 64 and 66 has been discharged through the resistance 71 and the gate electrode 72 the SCR will become non-conductive at a subsequent cross-over point between positive half cycles and negative half cycles applied to the nodes 90 and 92. Thus the AC current into nodes 90 and 92 ceases, the actuator coil 94 is deactivated and the contacts 16 and 18 are opened terminating the flow of current through the power lines 14 and 15 to the motor 10.

Figure 2:
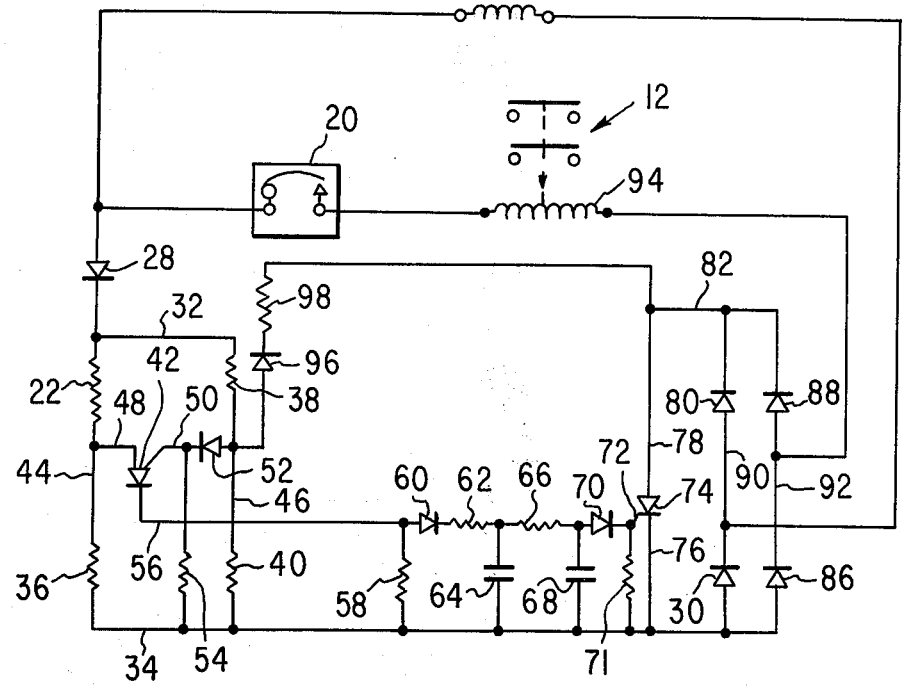
FIG. 2 is a diagram of a modified circuit in accordance with the invention.

A modified control circuit, shown in FIG. 2, has parts identified by the same numerals used to identify parts in the control circuit of FIG. 1 indicating that such commonly identified parts have substantially similar function and/or structure. The control circuit of FIG. 2 differs from the control circuit of FIG. 1 in that the thermostat switch 20 is in series with the holding coil 94 but not in series with nodes 32 and 34 of the resistance bridge circuit. Thus, the nodes 32 and 34 remain activated by rectified half pulses. With the thermosensing resistance 22 at a temperature less than the second predetermined temperature, the PUT 42 and the SCR 74 will remain conductive; and the contactor 12 will be actuated at temperatures above the first predetermined temperature and below the second predetermined temperature when the thermostat 20 closes. Only in event that the initial temperature or a subsequent temperature of the thermosensing resistance 22 increases above the second predetermined temperature is the PUT 42 maintained non conductive to deactuate the SCR 74. Then the actuating coil 94 cannot be reactivated until the thermosensing resistance 22 falls below the first predetermined temperature.

Figure 3:
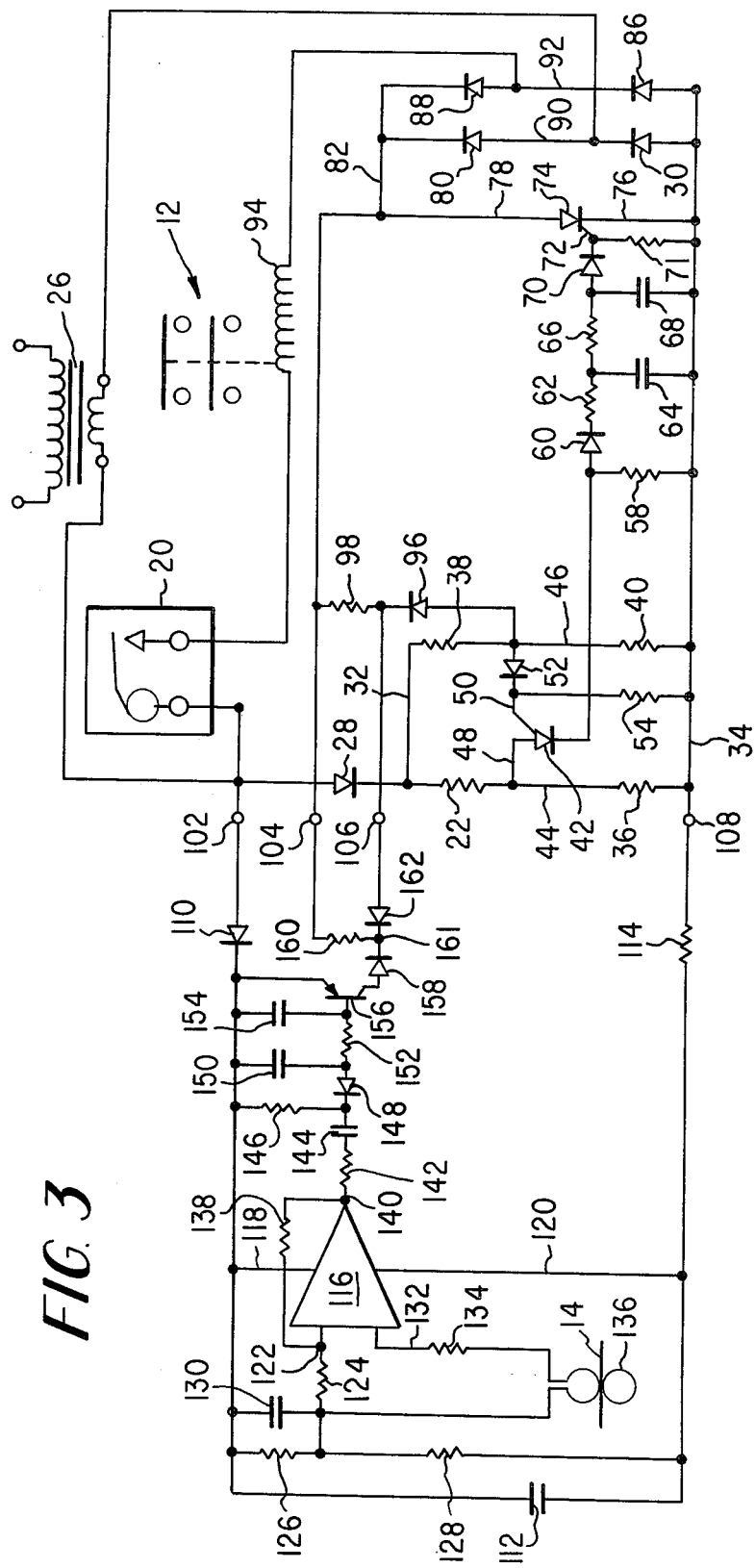
FIG. 3 is a diagram of a further modified circuit in accordance with the invention.

A further modification of the control circuit, shown in FIG. 3, contains to the right of terminals 102, 104, 106 and 108 circuitry which is substantially similar to that of the circuit in FIG. 2. Parts in FIG. 3 are identified by the same numerals previously used in FIGS. 1 and 2 indicating that such similarly identified parts have substantially the same structure and/or function. The terminal 102 is connected to the junction of the diode 28 to one side of the secondary of the transformer 26 while the terminal 108 is connected to the common node 34. The terminals 104 and 106 are connected to opposite sides of the resistor 98. The circuitry to the left of the terminals 102, 104, 106 and 108 is a current sensing circuit designed to sense a current magnitude in one or more power leads, such as the lead 14, corresponding to an unsafe or locked rotor condition of a motor.

A diode 110 connects the terminal 102 to one side of a capacitor 112 while a resistor 114 connects the terminal 108 to the other side of the capacitor 112 to provide a power supply for the current sensing circuit which includes an integrated circuit amplifier 116 having power terminals 118 and 120 connected to the opposite sides of the capacitor 112. One input terminal 122 of the amplifier 116 is connected by a resistor 124 to the junction of a pair of resistors 126 and 128 connected as a voltage divider across the capacitor 112. A capacitor 130 is connected across the resistor 126. The other input 132 of the amplifier 116 is connected in series with a resistor 134, a current sensing coil 136 and the resistor 124 to the first terminal 122. As illustrated, the current sensing coil 136 may be a coil wound in a figure eight configuration with the crossover point of the coil 136 disposed adjacent to the power line 14 to cause an induced voltage in the coil 136 upon current flowing through the line 14. A reverse feedback resistance 138 is connected between an output 140 of the amplifier 116 and the input 122.

The output 140 of the amplifier 116 is connected by a series resistance 142 and a capacitance 144 to a resistor 146 connected to the junction of the diode 110 and the capacitor 112. A voltage peak detecting and filter circuit includes a diode 148 having its cathode connected to the junction of the capacitor 144 and the resistor 146, a capacitor 150 connected to the anode of the diode 148 and the junction of the diode 110 and capacitance 112, and a resistor 152 connected between the junction of the diode 148 and the capacitor 150 in series with a capacitor 154 connected to the junction of the diode 110 and the capacitance 112. The junction of the capacitor 154 and the resistor 152 is connected to a base electrode of a PNP transistor 156 which has its emitter connected to the junction of the diode 110 and the capacitance 112. The collector of the transistor 156 is connected to an anode of a diode 158. The cathode of the diode 158 is connected to the junction 161 of a resistor 160 and a cathode of a diode 162, the resistor 160 connected through terminal 104 to the lead 78 and the anode of the diode 162 connected through terminal 106 to the junction of the diode 96 and resistance 98.

In operation of the modified circuit of FIG. 3, the current sensing coil 136 has induced therein an AC voltage from the current in the conductor 14. The voltage in the coil 136 is amplified by the amplifier 116 and applied by the output 140, resistor 142 and capacitor 144 to the diode 148 where it is rectified to charge the capacitors 150 and 154. The voltage on capacitor 154 is applied across the base-emitter junction of the transistor 156. At normal current levels in the conductor 116 corresponding to normal motor operation, the voltage produced across the emitter-base junction of the transistor 156 is insufficient to render the transistor 156 conductive. Thus the junction 161 of the diode 162 and the resistor 160 will be negative with respect to the node 46 causing current through the diode 96 to pass through the diode 162 and resistance 160 thus connecting the resistor 160 in parallel with the resistors 98, 40 and 54. With the combined parallel value of the resistors 160, 98, 40 and 54 selected to cause conduction of the PUT 42 when the temperature of the thermosensing unit 22 is less than the second predetermined temperature the PUT 42 will be rendered nonconductive only at temperature above the second predetermined voltage.

In the event the current in the conductor 14 is unduly large, such as when a motor has a locked rotor, the output of the amplifier 140 will be sufficient to render the transistor 156 conductive causing the diode 158 to conduct and produce a positive voltage on the junction 161 of the diode 162 and the resistor 160 relative to the node 46. Thus the diode 162 is rendered nonconductive opening the circuit path through the resistor 160. Only the resistors 98, 40 and 54 will thus be connected in parallel between the nodes 46 and 34 resulting in a third predetermined temperature of operation for the PUT which is between the first and second temperatures of operation. The third predetermined temperature of operation is selected to provide for extra safety for example in the windings of a motor 10 which can be unduly heated by over-shoot of the temperature. With a locked rotor condition, the rapid increase in temperature of the conductors of insulated windings within the motor may be sufficiently greater than the temperature sensed by the thermosensor 22 such that the subsequent operation of the temperature sensor 22 may not be soon enough to prevent damage to the insulation on the windings of the motor. The circuit of FIG. 3 prevents the over-shoot damage when the rotor is locked by opening the contactor 12 at the third predetermined temperature which is lower than the relative high second predetermined temperature necessary to normally open the contactor when the motor is operating.

Figure 4:
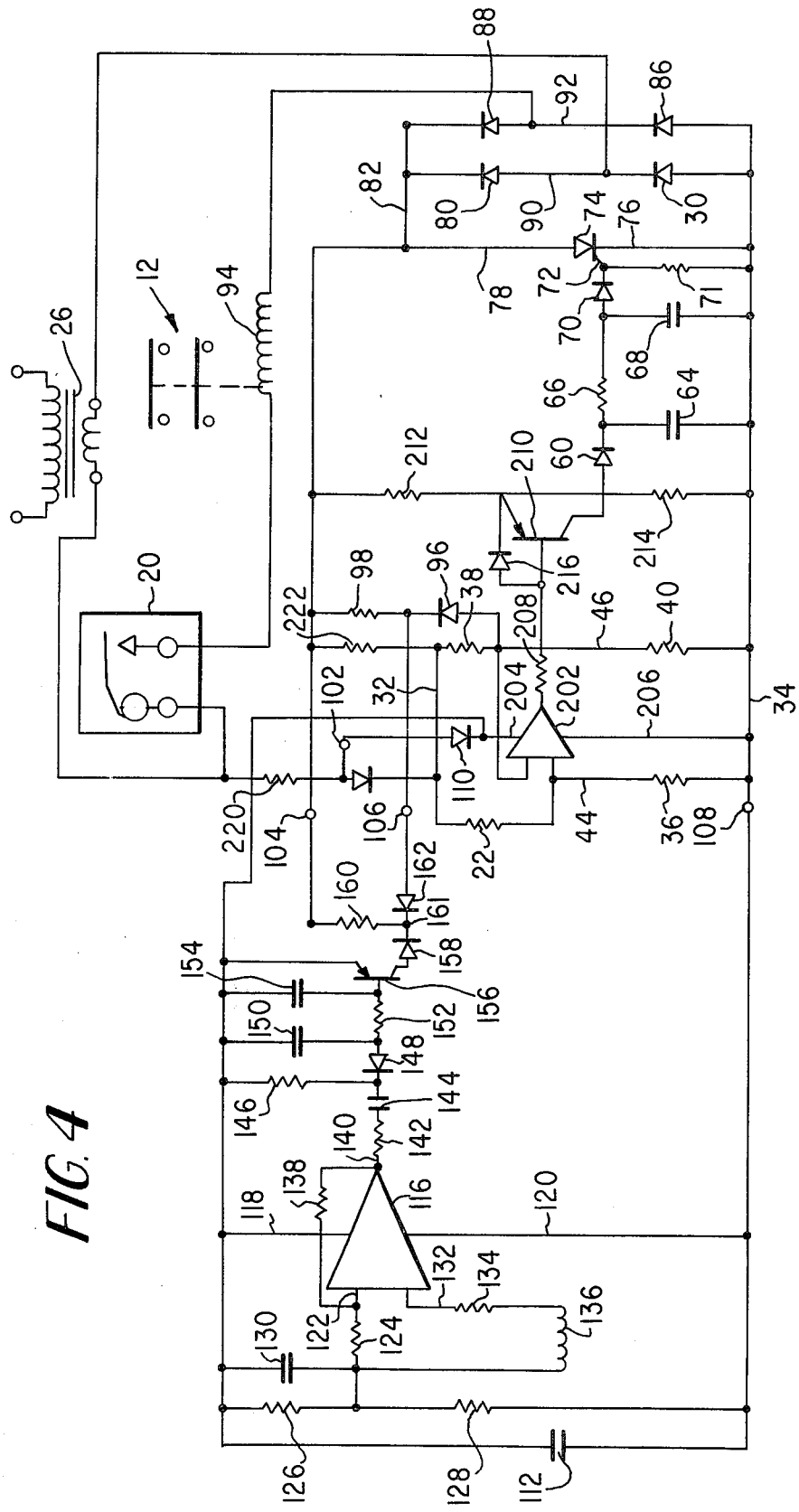
FIG. 4 is a diagram of a still further modified circuit in accordance with the invention.

A third variation of the control circuit, as illustrated in FIG. 4, has numerals identifying parts which are the same numerals used to identify parts in the control circuit in FIGS. 1, 2 and 3 indicating that such commonly identified parts have substantially the same function and/or structure. The control circuit of FIG. 4 differs from that of FIG. 3 in that the voltage sensing facilities for the sensing nodes 44 and 46 of the resistance bridge include an integrated circuit amplifier 202 which has its inputs connected to the sensing nodes 44 and 46 to produce a non-inverted amplified output of the voltage or node 46 relative to node 44. The power terminals 204 and 206 of the amplifier 202 are connected respectively to the cathode of the diode 110 and to the common node 34. The output of the amplifier 202 is connected by a resistance 208 to the base of a PNP transistor 210 which has an emitter connected to the junction of resistors 212 and 214 connected serially across the nodes 82 and 34. A protective diode 216 is connected across the emitter and base of the transistor 210 to prevent the application of excessive negative bias on the base of the transistor 210 by the output of the amplifier 202. The collector of the transistor 210 is connected to the anode of the diode 60 which is then connected to the filter circuit containing the capacitor 64, resistor 66, and capacitor 68 which operates the SCR 74 as previously described.

Another difference from the circuit of FIG. 3 is the inclusion of a resistor 220 between the secondary winding of the transformer 26 and the anode of the diode 28 and the insertion of a resistor 222 between the node 32 of the resistance bridge and lead 78 of the SCR 74.

In operation of the modified circuit of FIG. 4, the amplifier 202, having a high amplification factor, switches from a high output to a low output or visaversa when the voltage balance between the nodes 44 and 46 changes due to the sensing of the thermosensing resistor 22. When the output of the amplifier 202 is positive corresponding to the temperature of the thermosensing element 22 exceeding the first, second or third predetermined temperature, corresponding to whether no resistance is connected in parallel with the resistor 40, the resistor 98 is connected by the SCR 72 in parallel with the resistor 40, and both the resistors 98 and 160 are connected in parallel with the resistor 40, respectively, the transistor 210 is nonconductive which produces a zero voltage level across the resistor 71 producing the nonconductive state of the SCR 74. Conversely, if the output of the amplifier 202 is negative corresponding to the thermosensing resistor 22 sensing a temperature which is below the first, second or third predetermined temperatures when no resistors connected in parallel with the resistance 40, the resistor 98 is connected in parallel with the resistor 40, or the resistances 98 and 160 are connected in parallel with the resistance 40, respectively, the transistor 210 is rendered conductive which passes current through diode 60 to the filter charging the capacitors 64 and 68 causing the conduction of the SCR 74.

Also in the modified circuit of FIG. 4 when positive half cycles of voltage are applied to the node 32, the resistor 222 provides sufficient current through the SCR 74 to maintain the SCR 74 conducting and the resistance 98 in parallel with the resistance 40. Without the resistance 222, current through the resistance 98 might be insufficient to maintain conduction of the SCR 74; and without the conduction of the SCR 74 the resistance bridge circuit reverts to responding to the first predetermined temperature.

An advantage of the control circuits shown in FIGS. 1 through 4, is that the secondary switch means, i.e., the SCR 74, is utilized both for operating the primary power switch control, i.e., the contactor 12, and for closing a shunt circuit containing the resistor 98 or both the resistors 98 and 160, across one arm of the resistance bridge sensing circuit; thus the necessity in the prior art of utilizing separate switch elements for producing different states of operation of condition control circuits is rendered unnecessary producing a less expensive and more reliable circuit.

Another advantage of the motor protection circuit of FIGS. 1 through 4 is the utilization of a resistance bridge, i.e., a bridge having only resistances in all four arms thereof, wherein one of the arms includes the temperature responsive resistance for sensing the temperature of the motor windings. Prior art thermosensing motor protection circuits utilized a bridge employing a multiple tap transformer wherein tapped portions of the secondary of the transformer were utilized for at least two arms of the bridge circuit; such transformer windings were subject to greater expense in manufacture as well as being more subject to temperature variation by changes in ambient temperature.

The control circuit utilizes the unidirectional switch or SCR 74 in combination with the diode bridge circuit to energize the contactor winding 94. Unidirectional PNPN semiconductor switch devices have more uniform triggering response than bidirection semiconductor switch devices and do not chatter like relay devices. Further, the operation of the unidirection switch 74 and the diode bridge is not affected by a substantial lag between current flow and voltage in the contactor winding 94 which might affect common bidirection semiconductor switch devices.

Utilization of the current sensing coil 136 in close proximity to the line 14 eliminates the need for serially connected resistances or coils of current sensing relays and the like in power lines to motors.

Since many modifications, variations and changes in detail may be made to the present embodiments, it is intended that all matter in the foregoing description and in the accompanying drawings be interpreted as illustrative and not in a limiting sense.

What is claimed is:

1. A condition responsive control circuit comprising primary switch means having open and closed conditions and capable of controlling a power circuit;
   secondary switch means having an input and first and second output leads which are electrically connected when the secondary switch means is in a closed condition and which are electrically disconnected when the secondary switch means is in an open condition;
   said first output lead connected serially to the primary switch means for placing the primary switch means in one of its open and closed conditions when the secondary switch means is in its closed condition and for placing the primary switch means in the other of its open and closed conditions when the secondary switch means is in its open condition;
   condition responsive means including first and second resistances connected in a series circuit, a first junction intermediate a first side of the first resistance and the second resistance, a second junction on the second side of the first resistance, and a voltage responsive semiconductor control means having an input connected to the first junction and an output connected to the input of the secondary switch means;
   said second output lead of the secondary switch means connected to the second junction; and
   means connecting the first output lead to the first side of the first resistance to form a shunt circuit across the first resistance when the secondary switch means is closed, whereby the open and closed condition of the secondary switch means both operates the primary switch means and changes a resistance value between the first and second junctions.

2. A condition responsive control circuit as claimed in claim 1 wherein
   the means for connecting the first output lead to the first side of the first resistance includes a third resistance to be connected in parallel with the first resistance by the secondary switch means.

3. A condition responsive control circuit comprising primary switch means having open and closed conditions and capable of controlling a power circuit;
   secondary switch means having an input and first and second output leads which are electrically connected when the secondary switch means is in a closed condition and which are electrically disconnected when the secondary switch means is in an open condition;
   said first output lead connected to the primary switch means for placing the primary switch means in one of its open and closed conditions when the secondary switch means is in its closed condition and for placing the primary switch means in the other of its open and closed conditions when the secondary switch means is in its open condition;
   condition responsive means including first and second resistances connected in a series circuit, a first junction intermediate a first side of the first resistance and the second resistance, a second junction on the second side of the first resistance, and a voltage responsive semiconductor control means having an input connected to the first junction and an output connected to the input of the secondary switch means;
   said second output lead of the secondary switch means connected to the second junction;
   a third resistance connecting the first output lead to the first side of the first resistance to form a shunt circuit across the first resistance when the secondary switch means is closed, whereby the open and closed condition of the secondary switch means both operates the primary switch means and changes a resistance value between the first and second junctions;
   a fourth resistance; and second condition responsive means including tertiary switch means in series with the fourth resistance;

said series fourth resistance and tertiary switch means connected in parallel with said third resistance.

4. A condition responsive control circuit as claimed in claim 3 wherein said second condition responsive means includes means for sensing a magnitude of current exceeding a predetermined magnitude to operate the tertiary switch means.

5. A condition responsive control circuit comprising primary switch means having open and closed conditions and capable of controlling a power circuit;

secondary switch means having an input and first and second output leads which are electrically connected when the secondary switch means is in a closed condition and which are electrically disconnected when the secondary switch means is in an open condition;

said first output lead connected to the primary switch means for placing the primary switch means in one of its open and closed conditions when the secondary switch means is in its closed condition and for placing the primary switch means in the other of its open and closed conditions when the secondary switch means is in its open condition;

condition responsive means including first and second resistances connected in a series circuit, a first junction intermediate a first side of the first resistance and the second resistance, a second junction on the second side of the first resistance, and a voltage responsive semiconductor control means having an input connected to the first junction and an output connected to the input of the secondary switch means;

said second output lead of the secondary switch means connected to the second junction; and means connecting the first output lead to the first side of the first resistance to form a shunt circuit across the first resistance when the secondary switch means is closed, whereby the open and closed condition of the secondary switch means both operates the primary switch means and changes a resistance value between the first and second junctions;

said condition responsive means being a resistance bridge which includes the first resistance, the second resistance, a third resistance and a fourth resistance connected at a pair of input nodes and a pair of sensing nodes, said series circuit of the first resistance and second resistance being connected across the pair of input nodes with the second junction being one of the pair of input nodes, said third and fourth resistances being connected in series across the pair of input nodes, a junction intermediate the third and fourth resistances being one of the pair of sensing nodes, and the first junction being the other of the pair of sensing nodes;

one of said first, second, third and fourth resistances being a condition responsive resistance and said voltage responsive semiconductor control means having its input connected across the sensing nodes.

6. A condition responsive control circuit as claimed in claim 5 wherein said condition responsive resistance is a temperature responsive resistance.

7. A condition responsive control circuit as claimed in claim 6 wherein the means for connecting the first output lead to the first side of the first resistance includes a fifth resistance to be connected in parallel with the first resistance by the secondary switch means; and there is included a sixth resistance, and current responsive means including tertiary switch means in series with the fourth resistance for closing when a magnitude of current exceeding a predetermined magnitude is sensed, said series sixth resistance and tertiary switch means connected in parallel with the fifth resistance.

8. A condition responsive control circuit as claimed in claim 7 wherein the tertiary switch means includes a switching diode.

9. A thermal protection circuit for a motor comprising a resistance bridge circuit including first, second, third and fourth resistance arms connected at power input nodes and sensing nodes;

said first resistance arm including a temperature responsive resistance for sensing a temperature condition of the motor;

means connected to the power nodes of the bridge circuit for connecting the power nodes across an AC source;

voltage responsive semiconductor means connected across the sensing nodes for producing a unidirectional pulse output when the temperature responsive resistance senses a temperature below a predetermined minimum temperature;

filter means for filtering the unidirectional pulse output of the voltage responsive semiconductor means;

a motor relay means for controlling current to the motor; and semiconductor switch means controlled by an output of the filter means and connected in series with the motor relay means for being connected across the AC source.

10. A thermal protection circuit as claimed in claim 9 wherein the means connected to the power input nodes of the resistance bridge circuit includes a diode for applying a rectified AC signal to the power input nodes of the resistance bridge circuit.

11. A condition responsive control circuit comprising a resistance bridge including first, second, third and fourth resistance arms connected at a pair of power input nodes and a pair of sensing nodes;

said first resistance arm containing a condition responsive resistance;

a diode bridge including first, second, third and fourth diodes connected at a pair of alternating current input nodes and a pair of unidirectional output nodes;

one of said pair of power input nodes of the resistance bridge and one of said pair of unidirectional output nodes of the diode bridge being connected together;

means including first and second lines for connecting to an alternating current source;

an alternating current responsive control relay having a winding electrically connected at one end to the first line and electrically connected at its other end to one of the pair of alternating current input nodes of the diode bridge;

the other of said pair of alternating current input nodes of the diode bridge being electrically connected to the second line;

unidirectional semiconductor switch means connected between the pair of unidirectional output nodes of the diode bridge;

means connecting the other of the pair of power input nodes of the resistance bridge to the first line;

voltage responsive means connected to the sensing nodes of the resistance bridge for operating the unidirectional semiconductor switch means when a predetermined condition is sensed by the condition responsive resistance;

said unidirectional semiconductor switch means including a PNPN semiconductor which has anode and cathode electrodes with a gate electrode responsive to a current therethrough for triggering undirectional avalanche current flow between the anode electrode and the cathode electrode; and said voltage responsive means including a semiconductor device which produces a pulsed unidirection output when the voltage across the sensing nodes exceeds a predetermined polarity, and filter means for filtering the pulsed unidirection output of the semiconductor device to apply a filtered signal to the gate electrode of the PNPN semiconductor.

12. A condition responsive control circuit as claimed in claim 11 wherein the semiconductor device is an integrated amplifier circuit.

13. A protection circuit for an AC motor comprising
a pair of electrical lines for connecting the motor to an AC source;
switch means for controlling power flow through the electrical lines;
a magnetic flux responsive coil positioned adjacent at least one of said pair of electrical lines for producing an AC voltage having a magnitude proportional to the current through the pair of electrical lines;
a temperature responsive resistance for sensing a temperature condition of the motor; and
means responsive to the voltage of the magnetic flux responsive coil exceeding a predetermined magnitude and responsive to the temperature responsive resistance sensing a temperature condition exceeding a predetermined temperature for operating the switch means to terminate power flow through the pair of electrical lines;
said means for operating the switch means including means for amplifying the AC voltage from the magnetic flux responsive coil, and means for detecting the peak amplitude of an output of the amplifying means.

14. A protective circuit for an AC motor comprising
a pair of electrical lines for connecting the motor to an AC source;
switch means for controlling power flow through the electrical lines;
a magnetic flux responsive coil positioned adjacent at least one of said pair of electrical lines for producing an AC voltage having a magnitude proportional to the current through the pair of electrical lines;
a temperature responsive resistance for sensing a temperature condition of the motor; and
means responsive to the voltage of the magnetic flux responsive coil exceeding a predetermined magnitude and responsive to the temperature responsive resistance sensing a temperature condition exceeding a predetermined temperature for operating the switch means to terminate power flow through the pair of electrical lines;
said means for operating the switch means including means responsive to the voltage of the magnetic flux responsive coil for changing the means for operating the switch means such that the means for operating the switch means is responsive to a temperature condition sensed by the temperature sensing resistance exceeding a first temperature when the voltage is less than the predetermined magnitude and exceeding a second temperature when the voltage is greater than the predetermined magnitude to terminate power flow through the pair of electrical lines, said first predetermined temperature being greater than said second predetermined temperature.

15. A protective circuit for an AC motor comprising
a pair of electrical lines for connecting the motor to an AC source;
switch means for controlling power flow through the electrical lines;
a magnetic flux responsive coil positioned adjacent at least one of said pair of electrical lines for producing an AC voltage having a magnitude proportional to the current through the pair of electrical lines;
a temperature responsive resistance for sensing a temperature condition of the motor; and
means responsive to the voltage of the magnetic flux responsive coil exceeding a predetermined magnitude and responsive to the temperature responsive resistance sensing a temperature condition exceeding a predetermined temperature for operating the switch means to terminate power flow through the pair of electrical lines;
said means for operating the switch means including a second resistance, means responsive to the relative values of the temperature responsive resistance and the second resistance for operating the switch means, a third resistance, and means for connecting the third resistance in parallel with the second resistance in response to the voltage of the magnetic flux responsive coil exceeding the predetermined magnitude.

16. A protective circuit for a motor comprising
a step-down voltage transformer having a primary winding and a secondary winding;
a resistance bridge circuit including a first resistance connected between a first power input node and a first sensing node, a second resistance connected between the first sensing node and a second power input node, a third resistance connected between the first power input node and a second sensing node and a fourth resistance connected between the second sensing node and the second power input node;
said first resistance being positioned within the motor and having a positive temperature coefficient of resistance;
a diode bridge circuit including a first diode connected between a first unidirectional node and a first alternating current node, a second diode connected between the first alternating current node and a second unidirectional node, a third diode connected between the first unidirectional node and a second alternating current node, and a fourth diode connected between the second alternating current node and the second unidirectional node;

said first, second, third and fourth diodes having a polarity to conduct positive current from the first unidirectional node to the second unidirectional node;

said second power input node of the resistance bridge circuit being connected to the first unidirectional node of the diode bridge circuit;

a fifth diode connected between one side of the secondary winding of the transformer and the first power input node of the resistance bridge circuit to conduct positive pulsed current to the first power input node;

said first alternating current node of the diode bridge circuit being connected to the other side of the secondary winding of the transformer;

a PNPN unidirectional semiconductor switch having an anode electrode connected to the second unidirectional node and a cathode electrode connected to the first unidirectional node, and a gate electrode for triggering avalanche conduction between the anode electrode and the cathode electrode of the semiconductor switch;

a contactor having an alternating current responsive winding connected between the second alternating current node of the diode bridge circuit and the one side of the secondary winding of the transformer;

means including a first semiconductor integrated circuit amplifier having its input connected across the first and second sensing nodes of the resistance bridge circuit for producing an output voltage only when the first sensing node is positive with respect to the second sensing node;

first detector and filter means for filtering the output of the positive output voltage producing means.

means connecting the output of the detector and filter means to the gate electrode of the semiconductor switch;

a fifth resistance;

a sixth diode;

said fifth resistance and sixth diode being connected in a series circuit between the second sensing node of the resistance bridge circuit and the anode electrode of the semiconductor switch;

a sixth resistance;

a seventh diode;

said sixth resistance and seventh diode being connected in a series circuit across the fifth resistance;

a motor current sensing coil;

a second integrated circuit amplifier for amplifying a voltage from the motor current sensing coil;

second detector and filter means for detecting and filtering the output of the second integrated circuit; and a transistor means responsive to the output of the second detector and filter means for rendering the seventh diode conductive when the motor current sensing coil sense a predetermined magnitude of motor current.

* * * * *